United States Patent
Rowley et al.

(10) Patent No.: US 10,719,241 B2
(45) Date of Patent: Jul. 21, 2020

(54) POWER MANAGEMENT INTEGRATED CIRCUIT WITH EMBEDDED ADDRESS RESOLUTION PROTOCOL CIRCUITRY

(71) Applicant: Micron Technology, Inc., Boise, ID (US)

(72) Inventors: Matthew David Rowley, Boise, ID (US); David Matthew Springberg, Fort Collins, CO (US); Dustin James Carter, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/990,497

(22) Filed: May 25, 2018

(65) Prior Publication Data

US 2019/0361613 A1    Nov. 28, 2019

(51) Int. Cl.
*G06F 13/42* (2006.01)
*G06F 3/06* (2006.01)

(52) U.S. Cl.
CPC .......... *G06F 3/0613* (2013.01); *G06F 3/0625* (2013.01); *G06F 3/0647* (2013.01); *G06F 3/0673* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 6,199,112 B1 * | 3/2001 | Wilson | H04L 29/12028 340/475 |
| 8,185,165 B2 * | 5/2012 | Beninghaus | H04W 52/028 455/574 |
| 9,842,638 B1 * | 12/2017 | Li | G11C 11/1697 |
| 2015/0256546 A1 * | 9/2015 | Zhu | H04W 12/08 726/4 |
| 2015/0281246 A1 * | 10/2015 | Lewis | H04L 63/101 726/4 |
| 2015/0365376 A1 * | 12/2015 | Kang | H04W 8/26 370/328 |
| 2017/0069356 A1 | 3/2017 | Schmidt et al. | |
| 2017/0153680 A1 | 6/2017 | Girard et al. | |
| 2017/0242606 A1 | 8/2017 | Vlaiko et al. | |
| 2017/0351315 A1 | 12/2017 | Ochoa Munoz et al. | |
| 2018/0061510 A1 | 3/2018 | Han et al. | |
| 2018/0357187 A1 * | 12/2018 | Loewen | G06F 13/1631 |
| 2019/0057049 A1 * | 2/2019 | Koo | G06F 13/1668 |

OTHER PUBLICATIONS

International Search Report and Written Opinion, PCT/US2019/033609, dated Sep. 17, 2019.

* cited by examiner

*Primary Examiner* — Elias Mamo
(74) *Attorney, Agent, or Firm* — Greenberg Traurig

(57) ABSTRACT

Disclosed is a power management integrated circuit with embedded address resolution protocol functionality. In one embodiment, a device is disclosed comprising a data storage device; and an address resolution protocol (ARP) state machine communicatively coupled to the data storage device and included within a power management integrated circuit (PMIC), the ARP state machine configured to assign an address to the data storage device and validate requests for data stored in the data storage device received over a bus.

20 Claims, 4 Drawing Sheets

POWER MANAGEMENT INTEGRATED CIRCUIT WITH EMBEDDED ADDRESS RESOLUTION PROTOCOL CIRCUITRY

FIELD OF THE TECHNOLOGY

At least some embodiments disclosed herein relate to power management integrated circuit (PMIC) in general and, more particularly but not limited to, a PMIC with embedded address resolution protocol (ARP) circuitry.

BACKGROUND

A memory system can be a storage system, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

A memory system can include a PMIC to manage the power requirements of the memory system in which the PMIC is configured. The PMIC typically includes electronic power conversion circuitry and relevant power control functions. A PMIC additionally allows for programmable control of the functionality of the PMIC. For example, a PMIC may be reconfigured to change the power sequence, output voltages, and various other functions of the PMIC.

Certain dedicated hardware is included within a PMIC package to support access to data regarding the PMIC and/or data regarding the device(s) regulated by the PMIC such as vital product data (VPD). Existing techniques for providing access to data such as VPD involve the use of dedicated microcontrollers or functionality included within a memory controller to perform authentication and resolution of requests for data. The inclusion of additional hardware to provide access to data increases the complexities and reduces the security of access to data. Additionally, the additional components to manage data are required to be in an always on domain of the storage device and thus requires additional power during sleep states.

BRIEF DESCRIPTION OF THE DRAWINGS

The embodiments are illustrated by way of example and not limitation in the figures of the accompanying drawings in which like references indicate similar elements.

DETAILED DESCRIPTION

Aspects of the present disclosure are directed to a power management integrated circuit (PMIC) in a memory system. An example of a memory system is a storage system, such as a solid-state drive (SSD). In some embodiments, the memory system is a hybrid memory/storage system. In general, a host system can utilize a memory system that includes one or more memory devices. The memory devices can include media. The media can be non-volatile memory devices, such as, for example, NAND Flash devices. The host system can provide write requests to store data at the memory devices of the memory system and can provide read requests to retrieve data stored at the memory system. A memory system can include a controller that manages the memory devices to perform operations such as reading data, writing data, or erasing data and other such operations. A storage system (also hereinafter referred to as storage device) is used as one example of the memory system hereinafter throughout this document.

Figure 1:
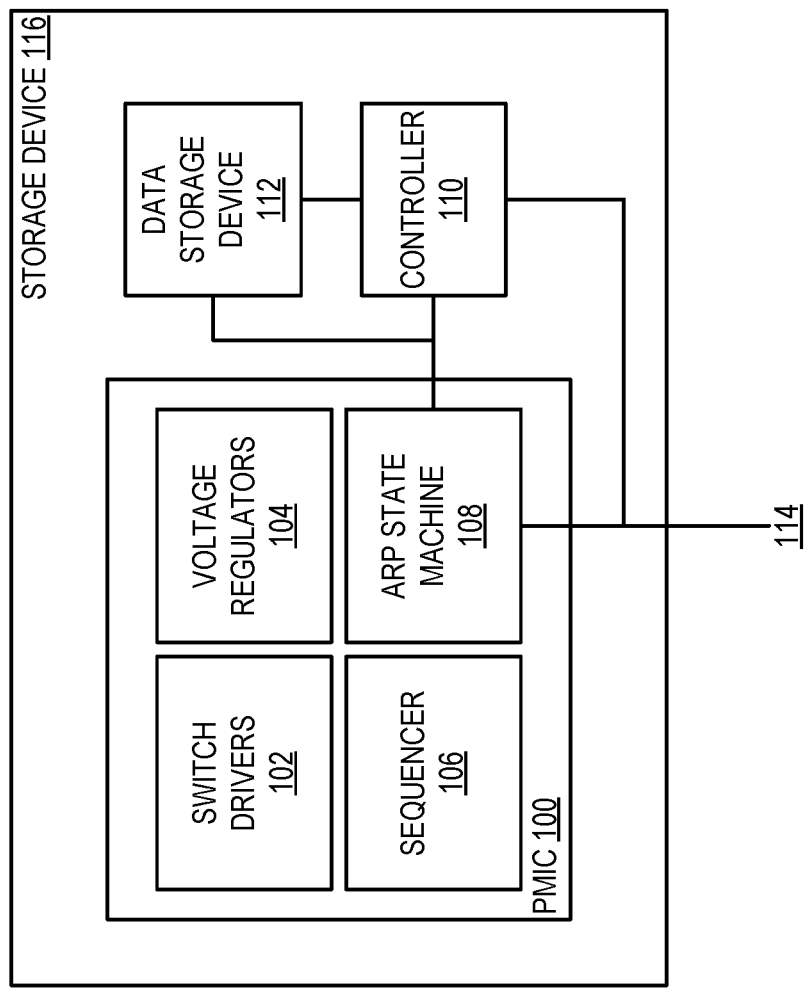
FIG. 1 is a block diagram of a storage device according to some embodiments of the disclosure.

FIG. 1 is a block diagram of a storage device according to some embodiments of the disclosure.

The storage device (116) illustrated in FIG. 1 includes a PMIC (100), a controller (110), a data storage device (112), and bus (114). The PMIC (100) includes switch drivers (102), voltage regulators (104), sequencer (106), and an address resolution protocol (ARP) state machine (108). In one embodiment, the PMIC (100) is connected to a host device via a bus (114), such as an I2C or SMBus bus. A host application (not illustrated) comprises an external computing device that issues read or write requests to data storage device (112). In the illustrated embodiment, the device (116) is configured to receive and transmit commands over the bus (118) and provide access to data storage device (112) via resolution performed by ARP state machine (108) and controller (110). In some embodiments, the data storage device (112) may comprise, or include, a read-only storage device, or partition, storing, for example, VPD.

The PMIC (100) has one or more voltage regulators (104) that convert the external power supply to the PMIC (100) to operating voltages used by various components of the device (or devices) powered by the PMIC (100) (e.g., solid-state storage devices, DRAM, etc.). The PMIC (100) includes a plurality of switch drivers (102) that provide the control signals for the load switches (not illustrated) that selectively enable and disable power to and from the supported devices. The PMIC (100) includes a sequencer (106) that schedules the power-related events according to desirable sequences for the operations of the supported devices, including the sequences of the operations of the voltage regulators (102) and the switch drivers (104). In one embodiment, drivers (102), regulators (104) and sequencer (106) may comprise a power subsystem within the PMIC (100).

PMIC (100) additionally includes an ARP state machine (108). In one embodiment, ARP state machine (108) comprises hardwired circuitry. In alternative embodiments, ARP state machine (108) may comprise a software-based state machine.

In the illustrated embodiment, ARP state machine (108) receives messages via bus (114). In one embodiment, these messages comprise ARP messages to resolve the address of the storage device (116). In one embodiment, ARP state machine (108) is designed to conform with standardized ARP functionality, such as that defined in System Management Bus (SMBus) Specification version 3.1.

In addition to providing ARP functionality, ARP state machine (108) is configured to allow or disallow external access to data storage device (112) via controller (110). In one embodiment, ARP state machine (108) controls the resolution of the address of the device (116) to external devices. Thus, ARP state machine (108) acts as a gateway to prevent unauthorized access to controller (110) and data storage device 112. For example, if an external device attempts to access controller (110) without properly authenticating with ARP state machine (108), such requests would be denied. Alternatively, or in conjunction with the foregoing, the PMIC (100) may obfuscate the address of the controller and only provide a proper address to an external device that obtains the address through the ARP registration procedure included in ARP state machine (108).

As illustrated, requests for data stored in data storage device (112) may be mediated by controller (110). In one embodiment, controller (110) includes logic or circuitry to allow or deny access to data storage device (112). In one embodiment, controller may determine whether requests for data include a properly addressed network location for the data storage device (112). In this manner, ARP state machine (108) and controller (110) communicate to assign a known address for the controller (110). Thus, authorized devices may only receive the actual address of the data storage device (112) via a ARP resolution procedure (as defined in defined in System Management Bus (SMBus) Specification version 3.1. Alternatively, or in conjunction with the foregoing, once configured, the data storage device (112) may be accessible to external devices via bus (114) without mediation by the controller. In this embodiment, controller (110) may be powered off (e.g., when in a low power or sleep state), while data storage device (112) will still be driven by PMIC (100) and accessible via bus (114). In this embodiment, ARP state machine (108) is configured to processing incoming messages and route messages to data storage device (112).

In one embodiment, vital product data is stored within data storage device (112). In one embodiment, data storage device (112) may comprise any type of persistent storage device such as EEPROM, ROM, Flash, or similar storage technologies. Generally, data storage device (112) stores data such as part numbers, serial numbers, engineering change levels, drive health data, and other important data related to the device (116).

Figure 2A:
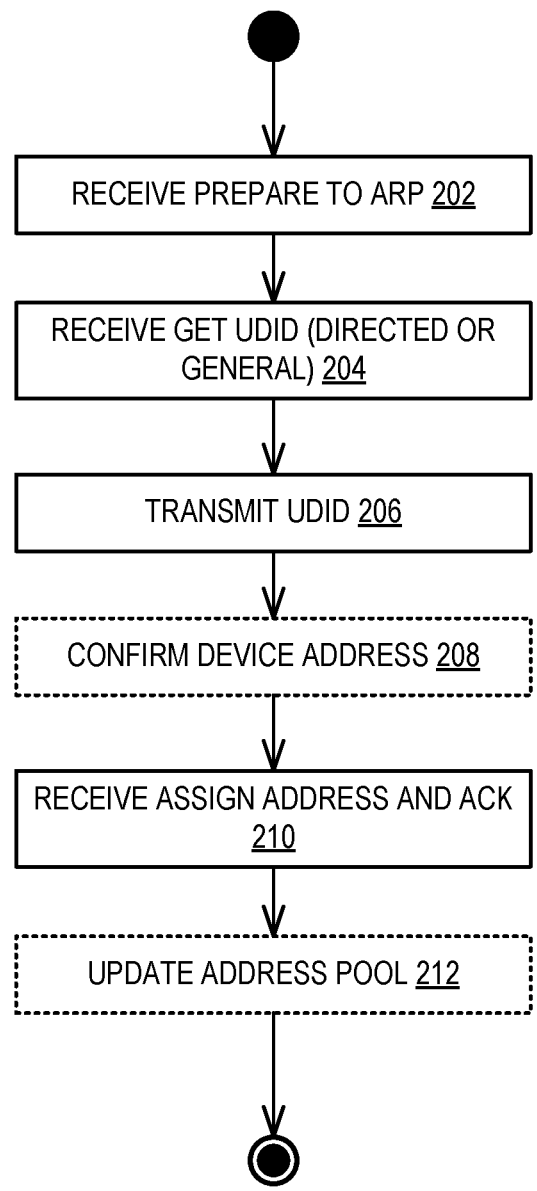
FIG. 2A is a flow diagram illustrating a method for implementing address resolution protocol (ARP) functionality in a storage device according to some embodiments of the disclosure.

FIG. 2A is a flow diagram illustrating a method for implementing address resolution protocol (ARP) functionality in a storage device according to some embodiments of the disclosure.

In block 202, the method receives a prepare to ARP message. In one embodiment, the prepare to ARP message identifies that an external device is initiating an ARP process.

In block 204, the method receives a get unique device identifier (UDID) command from the ARP master. This command may directed to a single device or may be a general command issued to all ARP-enabled devices.

In block 206, the method returns a UDID to the ARP master. The UDID corresponds to a unique identifier for the device implementing the method and includes the device's capabilities, a UDID version number, a vendor identifier, a device identifier, a protocol layer interface listing, and subsystem vendor identifier, a subsystem device identifier, and a vendor-specific identifier.

In block 208, the method confirms the device address. In one embodiment, block 208 is performed by the ARP master. In one embodiment, the method confirms the device address by performing one or more of confirming a byte count, verifying a device slave address of the ARP-enabled device is fixed, and determining if returned device slave address is in a used address pool. Once confirming the device address, the ARP master issues an assign address command. In one embodiment, the ARP master selects an address from a pool of addresses that are not currently used.

In block 210, the method receives an assign address command, assigns the received address as the devices new address, and returns an acknowledgment. In some embodiments, the method may return no acknowledgment if the device is not responsible for handling the assign address command.

In block 212, the ARP master updates the address pool after receiving the acknowledgment. In this block, the method continues to receive acknowledgments and building the address pool of ARP devices for all devices on the bus.

In one embodiment, the ARP master comprises the PMIC illustrated in FIG. 1. In this embodiment, the ARP state machine is responsible for maintaining the address pool (blocks 206 and 212) while the controller performs the remaining blocks (202, 204, 206, 210). In this manner, the ARP state machine manages the addresses assigned to the controller and, by proxy, to the VPD storage device.

After initializing the addresses of all slave devices, the ARP state machine is further configured to process non-ARP messages received over a bus.

Figure 2B:
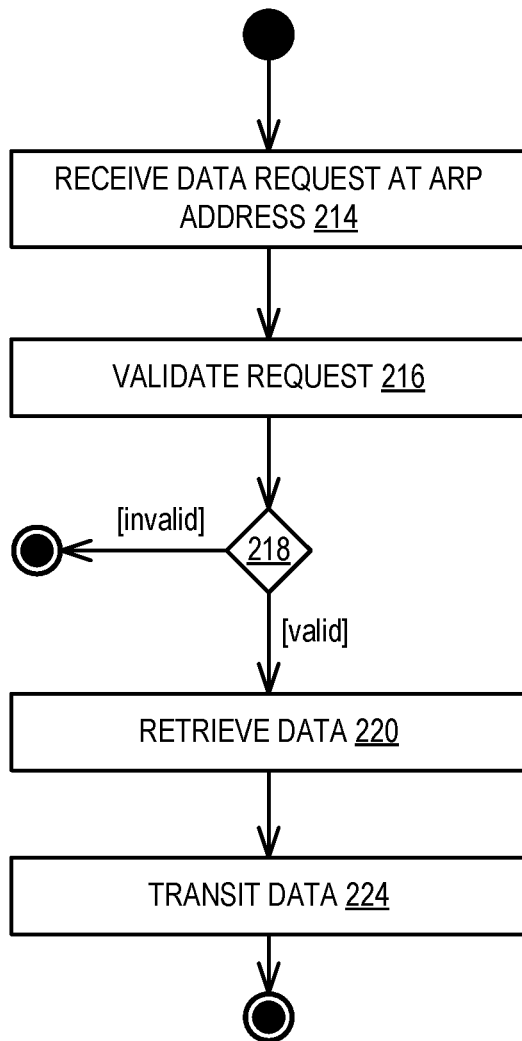
FIG. 2B is a flow diagram illustrating a method for validating data requests from external devices according to some embodiments of the disclosure.

FIG. 2B is a flow diagram illustrating a method for validating data requests from external devices according to some embodiments of the disclosure.

In block 214, the method receives a data request at an ARP address. In one embodiment, the data request comprises a request for VPD.

In one embodiment, the ARP state machine brokers all requests for data received from external devices. In one embodiment, a data request includes a listing of vital product data requested from the data storage device.

In block 216, the method validates the request.

In one embodiment, the method may validate the request by determining if the sender address has previously authenticated via ARP; that is, if the sender address is in the known address pool. In alternative embodiments, the method may validate the request by determining if the request includes a device identifier, vendor identifier, or similar identifier that is on a list of whitelisted senders.

In block 218, the method determines if the request is valid based on the results of block 216. If the method determines the request is invalid, the method ends. Alternatively, if the method determines the request is valid, the method proceeds to block 220 wherein the data is retrieved from a data storage device.

In an optional embodiment, the method may enable the controller prior to retrieving the data in block 220. In one embodiment, the controller may be configured to ignore all requests for vital product data to ensure against unauthorized access to the data storage device. In the illustrated embodiment, the method selectively enables read access by the controller in response to validating the received request based on the ARP resolution described in FIG. 2A. Once the controller is enabled, the parameters of the data request are transmitted to the controller and the controller accesses the data storage device (e.g., EEPROM).

In block 224, the method transmits the retrieved data back to the requesting device.

In one embodiment, the controller itself is connected to the bus that received the data request. Thus, in block 224, the controller may return the data on the bus. Alternatively, the ARP state machine may receive the data from the controller and respond to the data request with the returned data.

Figure 3:
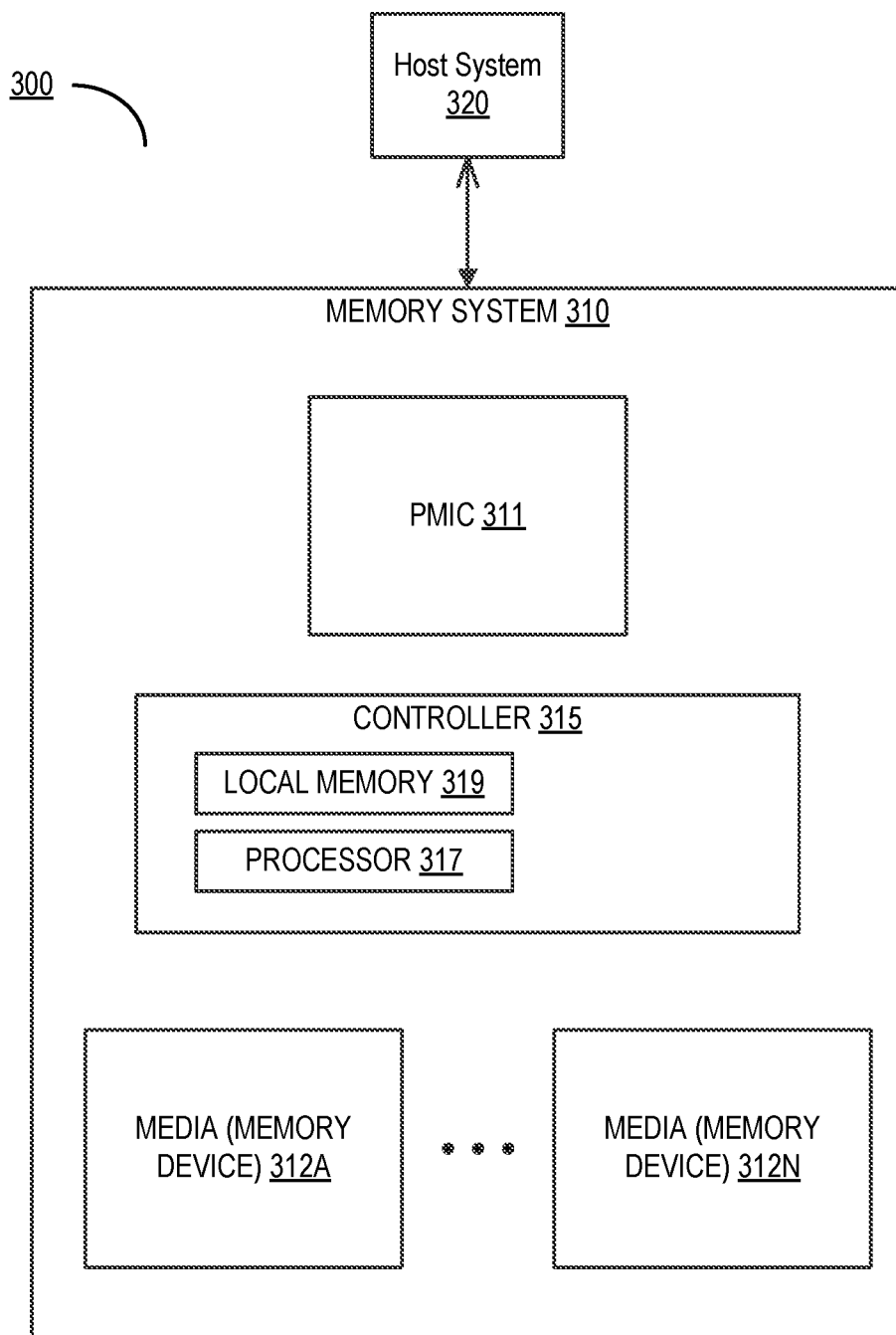
FIG. 3 illustrates an example computing environment that includes a memory system in accordance with some implementations of the present disclosure.

FIG. 3 illustrates an example computing environment 300 that includes a memory system 310 in accordance with some implementations of the present disclosure. The memory system 310 can include media, such as memory devices 312A to 312N. The memory devices 312A to 312N can be volatile memory devices, non-volatile memory devices, or a combination of such. In some embodiments, the memory system is a storage system. An example of a storage system is a SSD. In some embodiments, the memory system 310 is a hybrid memory/storage system. In general, the computing environment 300 can include a host system 320 that uses the memory system 310. In some implementations, the host system 320 can write data to the memory system 310 and read data from the memory system 310.

The host system 320 can be a computing device such as a desktop computer, laptop computer, network server, mobile device, or such computing device that includes a memory and a processing device. The host system 320 can include or be coupled to the memory system 310 so that the host system 320 can read data from or write data to the memory system 310. The host system 320 can be coupled to the memory system 310 via a physical host interface. As used herein, "coupled to" generally refers to a connection between components, which can be an indirect communicative connection or direct communicative connection (e.g., without intervening components), whether wired or wireless, including connections such as, electrical, optical, magnetic, etc. Examples of a physical host interface include, but are not limited to, a SMBus, interface, serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 320 and the memory system 310. The host system 320 can further utilize an NVM Express (NVMe) interface to access the memory devices 312A to 312N when the memory system 310 is coupled with the host system 320 by the PCIe interface. The physical host interface can provide an interface for passing control, address, data, and other signals between the memory system 310 and the host system 320.

The memory devices 312A to 312N can include any combination of the different types of non-volatile memory devices and/or volatile memory devices. An example of non-volatile memory devices includes a negative-and (NAND) type flash memory. Each of the memory devices 312A to 312N can include one or more arrays of memory cells such as single level cells (SLCs) or multi-level cells (MLCs) (e.g., triple level cells (TLCs) or quad-level cells (QLCs)). In some implementations, a particular memory device can include both an SLC portion and a MLC portion of memory cells. Each of the memory cells can store bits of data (e.g., data blocks) used by the host system 320. Although non-volatile memory devices such as NAND type flash memory are described, the memory devices 312A to 312N can be based on any other type of memory such as a volatile memory. In some implementations, the memory devices 312A to 312N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices 312A to 312N can be grouped as memory pages or data blocks that can refer to a unit of the memory device used to store data.

The controller 315 can communicate with the memory devices 312A to 312N to perform operations such as reading data, writing data, or erasing data at the memory devices 312A to 312N and other such operations. The controller 315 can include hardware such as one or more integrated circuits and/or discrete components, a buffer memory, or a combination thereof. The controller 315 can be a microcontroller, special purpose logic circuitry (e.g., a field programmable gate array (FPGA), an application specific integrated circuit (ASIC), etc.), or other suitable processor. The controller 315 can include a processor (processing device) 317 configured to execute instructions stored in local memory 319. In the illustrated example, the local memory 319 of the controller 315 includes an embedded memory configured to store instructions for performing various processes, operations, logic flows, and routines that control operation of the memory system 310, including handling communications between the memory system 310 and the host system 320. In some embodiments, the local memory 319 can include memory registers storing, e.g., memory pointers, fetched data, etc. The local memory 319 can also include read-only memory (ROM) for storing micro-code. While the example memory system 310 in FIG. 3 has been illustrated as including the controller 315, in another embodiment of the present disclosure, a memory system 310 may not include a controller 315, and may instead rely upon external control (e.g., provided by an external host, or by a processor or controller separate from the memory system).

In general, the controller 315 can receive commands or operations from the host system 320 and can convert the commands or operations into instructions or appropriate commands to achieve the desired access to the memory devices 312A to 312N. The controller 315 can be responsible for other operations such as wear leveling operations, garbage collection operations, error detection and error-correcting code (ECC) operations, encryption operations, caching operations, and address translations between a logical block address and a physical block address that are associated with the memory devices 312A to 312N. The controller 315 can further include host interface circuitry to communicate with the host system 320 via the physical host interface. The host interface circuitry can convert the commands received from the host system into command instructions to access the memory devices 312A to 312N as well as convert responses associated with the memory devices 312A to 312N into information for the host system 320.

The memory system 310 can also include additional circuitry or components that are not illustrated. In some implementations, the memory system 310 can include a cache or buffer (e.g., DRAM) and address circuitry (e.g., a row decoder and a column decoder) that can receive an address from the controller 315 and decode the address to access the memory devices 312A to 312N.

The memory system 310 can include PMIC 311 (e.g., PMIC 100 in FIG. 1). The memory system 310 can include additional circuitry, such as illustrated in FIG. 1.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A device comprising:
   a controller;
   a data storage device; and
   an address resolution protocol (ARP) state machine communicatively coupled to the data storage device and included within a power management integrated circuit (PMIC), the ARP state machine configured to:
      receive a data request message from the controller, the data request message including an ARP address,
      assign an address to the data storage device,
      validate requests for data stored in the data storage device received over a bus using the ARP address, and
      transmitting a signal to the controller, the signal enabling access to vital product data stored in the data storage device.

2. The device of claim 1, the data storage device comprising an EEPROM storage device.

3. The device of claim 1, the ARP state machine comprising a hard-wired circuit.

4. The device of claim 1, the ARP state machine comprising a programmable processing element.

5. The device of claim 1, the ARP state machine further configured to store a pool of addresses, the pool of addresses including an address of the data storage device.

6. The device of claim 1, the bus comprising an I2C or SMBbus.

7. The device of claim 1, the ARP state machine configured to validate requests for data stored in the data storage device by determining if a sender address of a request has previously authenticated via an ARP protocol.

8. The device of claim 1, the ARP state machine configured to validate requests for data stored in the data storage device by determining if a sender of a request is a whitelisted sender.

9. The device of claim 1, the ARP state machine configured to reject requests for data stored in the data storage device upon determining that the sender of a request for data stored in the data storage device is not an authorized sender.

10. A power management integrated circuit (PMIC) comprising:
   a power subsystem, the power subsystem including a plurality of switch drivers, a plurality of voltage regulators, and a sequencer; and
   an address resolution protocol (ARP) state machine communicatively coupled to a data storage device, the ARP state machine configured to:
      receive a data request message from a he controller, the data request message including an ARP address,
      assign an address to the data storage device,
      validate requests for data stored in a data storage device received over a bus using the ARP address, and
      transmit a signal to the controller, the signal enabling access to vital product data stored in the data storage device.

11. The PMIC of claim 10, the ARP state machine comprising a hard-wired circuit.

12. The PMIC of claim 10, the ARP state machine comprising a software-based state machine.

13. The PMIC of claim 10, the ARP state machine further configured to store a pool of addresses, the pool of addresses including an address of the data storage device.

14. The PMIC of claim 10, the ARP state machine configured to validate requests for data stored in the data storage device by determining if a sender address of a request has previously authenticated via an ARP protocol.

15. The PMIC of claim 10, the ARP state machine configured to validate requests for data stored in the data storage device by determining if a sender of a request is a whitelisted sender.

16. The PMIC of claim 10, the ARP state machine configured to reject requests for data stored in the data storage device upon determining that the sender of a request for data stored in the data storage device is not an authorized sender.

17. A method comprising:
   receiving, at an address resolution protocol (ARP) state machine embedded within a power management integrated circuit (PMIC) of a storage device, a request for data, the request for data including an ARP address;
   validating, by the ARP state machine, the request for data using the ARP address;
   transmitting a signal to the controller, the signal enabling access to vital product data stored in the data storage device; and
   returning, by the controller, one or more items of data in response to the request.

18. The method of claim 17, the returning one or more items of data performed by a controller device.

19. The method of claim 17, the returning one or more items of data performed by the ARP state machine.

20. The method of claim 17 further comprising assigning, by the ARP state machine, an ARP address to the data storage device and using the ARP address as the address while validating the request for data.

* * * * *